Nov. 26, 1935.                J. L. BYRNE                 2,021,982
                              EARTH AUGER
                          Filed April 30, 1934
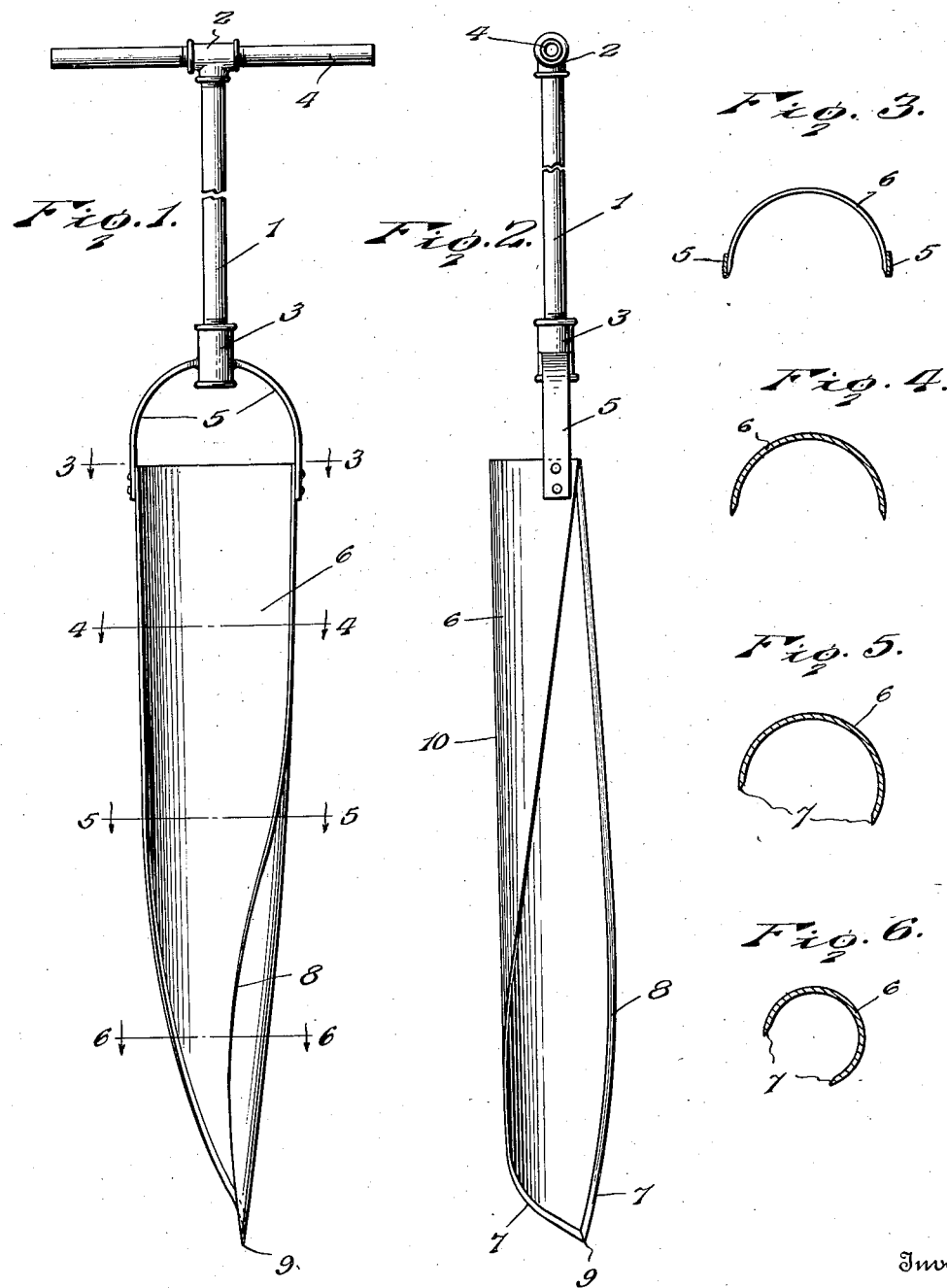
Inventor
J. L. Byrne.
By Lacey & Lacey, Attorneys Patented Nov. 26, 1935

2,021,982

UNITED STATES PATENT OFFICE 2,021,982

EARTH AUGER

Joseph L. Byrne, Tampa, Kans.

Application April 30, 1934, Serial No. 723,252

1 Claim. (Cl. 255—66)

This invention relates to earth augers and has for its object the provision of a very simple and inexpensive tool which may be easily operated and which will act efficiently to form a hole in the ground and lift from the hole the core of earth cut by the tool. The invention is illustrated in the accompanying drawing and will be hereinafter fully described, the novel features being particularly defined in the appended claim.

In the annexed drawing:

Figures 1 and 2 are elevations of a tool embodying the invention, the views being taken at a right angle to each other.

Figures 3, 4, 5 and 6 are sections on the lines 3—3, 4—4, 5—5 and 6—6, respectively, of Figure 1.

In carrying out the present invention, there is provided a shank 1 which is preferably of tubular form and threaded at its ends to engage in a T-coupling 2 at its upper end and in a nipple or sleeve 3 at its lower end. A cross bar or handle 4 is fitted through and secured in the T-coupling 2 and this cross bar may be of wood or may be a metallic pipe threaded into the coupling, as will be understood. Formed integral with or permanently united to the coupling 3 are tangs 5 which are disposed at diametrically opposite points of the coupling and are extended in arcuate form outwardly and downwardly therefrom to be riveted or otherwise rigidly secured to the corners of a blade 6. The blade 6 is preferably formed of steel and may be of such length as experience may determine to be most advantageous. At its upper extremity the blade defines a true semi-circle, as shown most clearly in Figure 3, and it gradually contracts or defines arcs formed about gradually lessening radii towards its lower end, as will be understood upon reference to Figures 4, 5 and 6. The edges of the blade are both sharpened, as shown most clearly at 7 in Figures 5 and 6, and one edge, which will for convenience be called the forward edge, is caused to roll sharply toward the opposite edge, as indicated at 8 in Figure 1, so that toward the point or lower end of the blade the two edges will be appreciably closer than at the upper end of the blade, defining an arc of approximately three-fourths of a circle and will be, consequently, adapted to effectually hold a core of earth cut by the tool in its use. The blade is not only rolled so as to define a gradually narrowing arc but it is also tapered so that its lower extremity, as shown at 9, constitutes a point which will readily enter the ground. Upon reference to Figures 1 and 2, it will be noted that the forward or leading edge of the blade extends somewhat forwardly with respect to the vertical plane of the shank and the handle although rolling slightly inwardly with respect to the axis of the blade, and the rear or trailing edge of the blade recedes downwardly with respect to the vertical plane of the shank and handle. This relation of the edges continues for about one-half the length of the blades, at which point the rolling of the leading edge becomes more pronounced and the trailing edge converges more sharply toward the leading edge, the edges meeting and terminating in the sharp point 9.

In use, the tool is disposed in an upright position with its point 9 bearing upon the surface of the ground and pressure is then applied to the device through its handle, while it is also rotated to cause its forward or leading edge 8 to cut through the earth. It may be necessary, at times, to impart a backward turn to the tool and for this purpose I have formed cutting edges on both edges of the blade, the result having been found highly satisfactory in use. When the blade has penetrated the soil to the full length of the blade, an upward pull is exerted to withdraw the blade and, owing to the peculiar rolling formation of the blade, the soil will be somewhat compressed in its lower portion and consequently the core will be very firmly held within the blade and may be withdrawn from the hole as the blade is lifted. The withdrawal of the core is more easily accomplished if the soil is somewhat damp and, if it be dry, the pouring of a small quantity of water into the hole will render the core sufficiently cohesive to be retained within the blade so that it will be withdrawn as the blade is lifted. After the tool is clear of the ground, if it be turned so that the open portion of the blade is presented to the ground and a light rap or knock be given the tool, the core will be discharged therefrom onto the surface of the ground where it will be convenient for future use.

While the side edges of the blade are rolled toward each other to form a core-supporting enclosure, the back of the blade, as shown at 10 in Figure 2, follows a straight line from the center of the upper edge to a point intersecting the back or trailing edge of the blade so that, if the tool be properly positioned when entering the hole, the straight back of the blade will form a guide for maintaining the perpendicularity of the tool.

The tool is particularly adapted for forming post holes and actual use of the tool has demonstrated that it may be manipulated very easily and will rapidly and efficiently form the desired hole. The tool is light and inexpensive and is free of all complicated structure so that it is not apt to get out of order, but will be found to be very durable.

Having thus described the invention, I claim:

An earth auger comprising an elongated blade defining a semi-circle at its upper end and tapered to a penetrating point at its lower end, one side edge of the blade constituting a leading edge extending relatively slightly forwardly downward with respect to a vertical plane touching the upper corners of the blade and rolling inwardly toward the axis of the blade, and the other edge of the blade constituting a trailing edge receding downwardly with respect to said vertical plane and after intersecting the plane of the rear portion of the blade converging in its lower end portion to intersect the leading rolling edge and form the penetrating point at the lower end of the blade, the rolling of the leading edge being more pronounced in its lower portion whereby sections taken transversely of the blade in spaced relation to each other longitudinally thereof define arcs of decreasing radii downwardly.

JOSEPH L. BYRNE.